US009081754B1

(12) United States Patent
Natanzon et al.

(10) Patent No.: US 9,081,754 B1
(45) Date of Patent: Jul. 14, 2015

(54) METHOD AND APPARATUS FOR CASCADED REPLICATION USING A MULTI SPLITTER (75) Inventors: Assaf Natanzon, Tel Aviv (IL); Saar Cohen, Mishmeret (IL); Jehuda Shemer, Kfar Saba (IL); Alex Solan, Hertzliya (IL)

(73) Assignee: EMC Corporation, Hopkinton, MA (US)

( * ) Notice: Subject to any disclaimer, the term of this patent is extended or adjusted under 35 U.S.C. 154(b) by 463 days.

(21) Appl. No.: 13/436,720

(22) Filed: Mar. 30, 2012

(51) Int. Cl.
G06F 12/16 (2006.01)
G06F 11/20 (2006.01)
G06F 11/14 (2006.01)

(52) U.S. Cl.
CPC ........ *G06F 11/2074* (2013.01); *G06F 11/1471* (2013.01); *G06F 11/2058* (2013.01); *G06F 11/2064* (2013.01); *G06F 11/2082* (2013.01); *G06F 2201/84* (2013.01); *G06F 2201/855* (2013.01)

(58) Field of Classification Search
None
See application file for complete search history.

(56) References Cited

U.S. PATENT DOCUMENTS

| 7,516,287 | B2 * | 4/2009 | Ahal et al. ................ 711/162 |
| 8,335,761 | B1 * | 12/2012 | Natanzon ................ 707/626 |
| 2004/0193660 | A1 * | 9/2004 | Gagne et al. .............. 707/204 |
| 2006/0048014 | A1 * | 3/2006 | Takahashi et al. ........... 714/44 |

* cited by examiner

*Primary Examiner* — Denise Tran
(74) *Attorney, Agent, or Firm* — Krishnendu Gupta; Gerald P. Kazanjian (57) ABSTRACT Conventional method of replication do not allow cascaded replication with journaling. However, in example embodiments of the present invention, a splitter in storage or in the data path may split a single volume to multiple DPA targets. The splitter will intercept data arriving to the volume and split the data to another DPA, thereby allowing cascaded replication. In certain embodiments, the DPA may notify the splitter about a point of consistency because the DPA does not distribute IOs with write order fidelity at all times and only some points are write order fidelity consistent. Thus, the DPA may notify the splitter about a consistent point and the splitter will send notifications about the consistent points to the second DPA, allowing the volumes to have consistent points.

15 Claims, 9 Drawing Sheets

METHOD AND APPARATUS FOR CASCADED REPLICATION USING A MULTI SPLITTER

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

SUMMARY

Example embodiments of the present invention provide a method, an apparatus and a computer program product for cascaded replication using a multi splitter. The method includes intercepting an IO replicated from a first volume at a first site by a first data protection appliance (DPA) at the first site. The multi splitter then splits the IO to both a second volume at a second site and a second DPA at the second site for cascaded replication to a third volume at a third site via a third DPA at the third site.

BRIEF DESCRIPTION OF THE DRAWINGS

The above and further advantages of the present invention may be better under stood by referring to the following description taken into conjunction with the accompanying drawings in which.

DETAILED DESCRIPTION

The following definitions are employed throughout the specification and claims.

BACKUP SITE—a facility where replicated production site data is stored; the backup site may be located in a remote site or at the same location as the production site;

BLOCK VIRTUALIZATION—may be a layer which take back end storage volumes and, by slicing, concatenating and striping, creates a new set of volumes that serve as base volumes or devices in the virtualization layer;

CLONE—a clone may be a copy or clone of the image or images, drive or drives of a first location at a second location;

CONTINUOUS DATA PROTECTION (CDP)—may refer to a full replica of a volume or a set of volumes along with a journal which allows any point in time access, the CDP copy is at the same site, and may be in the same storage array as the production volume;

CONTINUOUS REMOTE REPLICATION (CRR)—may refer to a full replica of a volume or a set of volumes along with a journal which allows any point in time access at a site remote to the production volume and on a separate storage array;

DATA PROTECTION APPLIANCE (DPA)—a computer or a cluster of computers that serve as a data protection appliance, responsible for data protection services including inter alia data replication of a storage system, and journaling of I/O requests issued by a host computer to the storage system;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

DISTRIBUTED MIRROR—may be a mirror of a volume across a distance, either metro- or geo-, which is accessible at all sites;

FAIL ALL MODE—may be a mode of a volume in the splitter where all write and read I/Os intercepted by the splitter are failed to the host, but other SCSI command, like read capacity, are served;

GLOBAL FAIL ALL MODE—may be a mode of a volume in the virtual layer where all write and read I/Os to the virtual layer are failed to the host, but other SCSI commands, like read capacity, are served;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGGED ACCESS—may be an access method provided by the appliance and the splitter in which the appliance rolls the volumes of the consistency group to the point in time the user requested and let the host access the volumes in a copy on first write base;

LOGICAL UNIT—a logical entity provided by a storage system for accessing data from the storage system;

LUN—a logical unit number for identifying a logical unit;

MARKING ON SPLITTER—may be a mode in a splitter where intercepted I/Os are not split to an appliance and the storage, but rather changes (meta data) are tracked in a list and/or a bitmap and I/Os are sent immediately down the I/O stack;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

REPLICATION PROTECTION APPLIANCE (RPA)—another name for DPA;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period;

SPLITTER/PROTECTION AGENT—may be an agent running either on a production host a switch or a storage array which can intercept IO and split them to a DPA and to the storage array, fail IO redirect IO or do any other manipulation to the IO;

STORAGE MEDIUM—may refer to one or more storage mediums such as a hard drive, a combination of hard drives, flash storage, combinations of flash storage, combinations of hard drives, flash, and other storage devices, and other types and combinations of computer readable storage mediums including those yet to be conceived; a storage medium may also refer both physical and logical storage mediums and may include multiple level of virtual to physical mappings and may be or include an image or disk image;

STORAGE SYSTEM—a SAN entity that provides multiple logical units for access by multiple SAN initiators;

TARGET—a node in a SAN that replies to I/O requests;

TARGET SIDE—a receiver of data within a data replication workflow; during normal operation a back site is the target side, and during data recovery a production site is the target side;

VIRTUAL ACCESS—may be an access method provided by the appliance and the splitter in which the appliance exposes a virtual volume from a specific point in time to the host, the data for the virtual volume is partially stored on the remote copy and partially stored on the journal;

VIRTUAL VOLUME—may be a volume which is exposed to a host by a virtualization layer and may span across more than one site; and WAN—a wide area network that connects local networks and enables them to communicate with one another, such as the Internet.

Description of Embodiments Using a Five State Journaling Process

Figure 1:
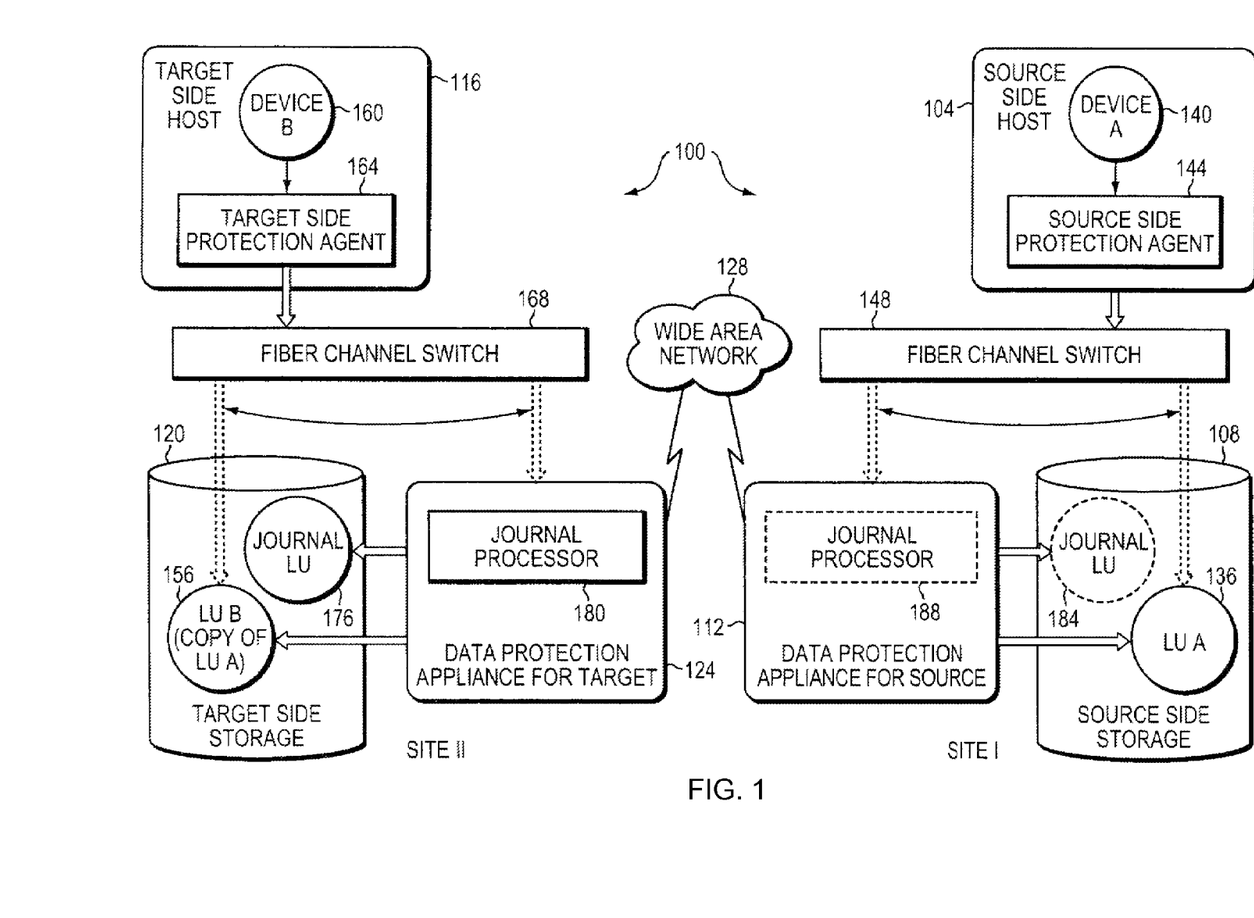
FIG. 1 is a simplified illustration of a data protection system, in accordance with an embodiment of the present invention.

FIG. 1 is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit;
Redirect the SCSI command to another logical unit;
Split the SCSI command by sending it first to the respective DPA. After the DPA returns an acknowledgement, send the SCSI command to its intended logical unit;
Fail a SCSI command by returning an error return code; and
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
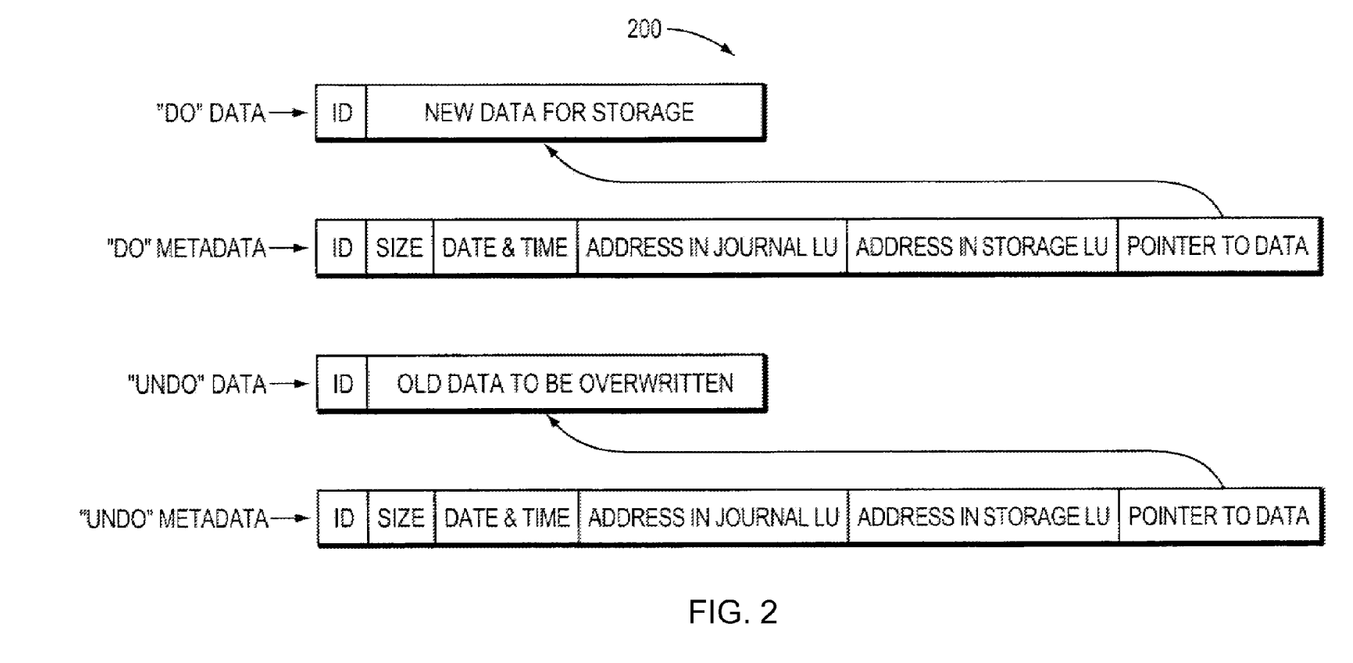
FIG. 2 is a simplified illustration of a write transaction for a journal, in accordance with an embodiment of the present invention.

FIG. 2 is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter mirrors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWERPATH), through an intelligent fabric switch, through array-based splitter, such as EMC CLARiiON.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

A discussion of mirroring may be found in U.S. Pat. No. 7,346,805, entitled "PROTECTION OF MIRRORED DATA," issued on Mar. 18, 2008 and assigned to EMC Corporation of Hopkinton, Mass., which is hereby incorporated by reference in its entirety.

A discussion of journaling and some techniques associated with journaling may be found in U.S. Pat. No. 7,516,287, entitled "METHODS AND APPARATUS FOR OPTIMAL JOURNALING FOR CONTINUOUS DATA REPLICATION," issued on Apr. 7, 2009 and assigned to EMC Corporation of Hopkinton, Mass., which is hereby incorporated by reference in its entirety.

A discussion of dynamically adding storage for a journal may be found in U.S. Pat. No. 7,840,536, entitled "METHODS AND APPARATUS FOR DYNAMIC JOURNAL EXPANSION," issued on Nov. 23, 2010 and assigned to EMC Corporation of Hopkinton, Mass., which is hereby incorporated by reference in its entirety.

Cascaded Replication Using a Multi Splitter

Conventional method of replication do not allow cascaded replication with journaling. However, in example embodiments of the present invention, a splitter in storage or in the data path may split a single volume to multiple DPA targets. Thus, the splitter may be in Split Mode for one target of the same volume and in Fail All Mode for another target (i.e., the splitter will allow only IOs arriving from the DPA managing the volume in Fail All Mode access the volume).

A discussion of multi splitters may be found in U.S. patent application Ser. No. 13/436,725, entitled "METHOD AND APPARATUS FOR MULTI-COPY REPLICATION USING A MULTI SPLITTER," filed on even date herewith and assigned to EMC Corporation of Hopkinton, Mass., which is hereby incorporated by reference in its entirety.

In example embodiments of the present invention, as described below, the splitter will intercept data arriving to the replica volume and split the data to another DPA, thereby allowing cascaded replication. In certain embodiments, the DPA may notify the splitter about a point of consistency because the DPA does not distribute IOs with write order fidelity at all times and only some points are write order fidelity consistent. Thus, the DPA may notify the splitter about a consistent point and the splitter will send notifications about the consistent points to the second DPA, allowing the volumes to have consistent points.

Figure 3:
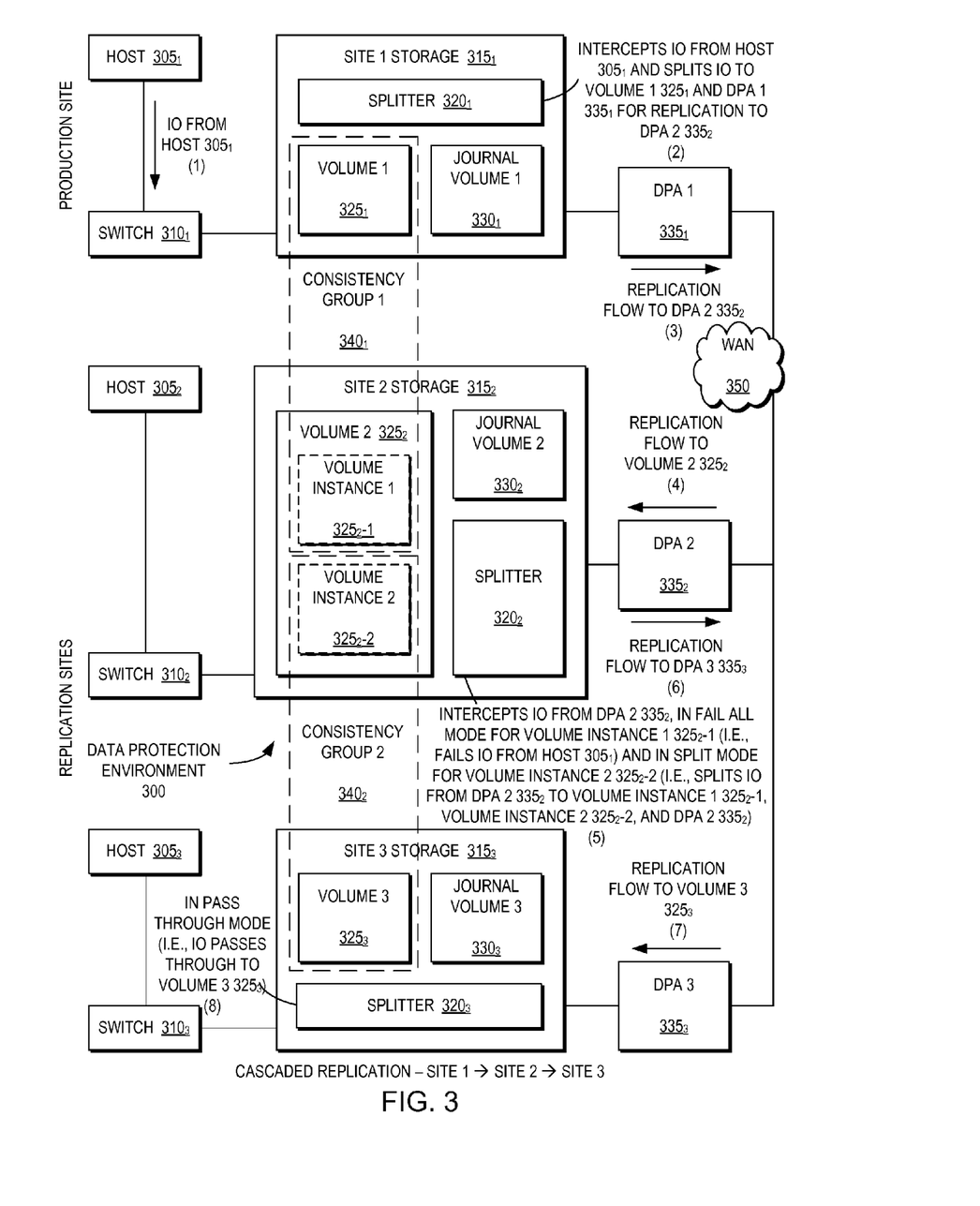
FIG. 3 is a block diagram illustrating cascaded replication of a first volume to a second volume, and from the second volume to a third volume according to an example embodiment of the present invention.

FIG. 3 is a block diagram illustrating a first volume $325_1$ replicated by cascaded replication from the first volume $325_1$ to second volume $325_2$, and from the second volume $325_2$ to a third volume $325_3$ according to an example embodiment of the present invention. FIG. 3 illustrates a replication environment 300 according to a replication service, which includes a first site comprising a first host $305_1$, a first switch $310_1$, first site storage $315_1$, a first splitter $320_1$, a first journal volume $330_1$ for continuous data protection of a first volume $325_1$, and a first replication appliance (i.e., data protection appliance (DPA)) $335_1$. The replication service also includes a second site comprising a second host $305_2$, a second switch $310_2$, second site storage $315_2$, a second splitter $320_2$, a second journal volume $330_2$ for continuous data protection of a second volume $325_2$, and a second DPA $335_2$. Further, the replication service includes a third site comprising a third host $305_3$, a third switch $310_3$, third site storage $315_3$, a third splitter $320_3$, a third journal volume $330_3$ for continuous data protection of a third volume $325_3$, and a third DPA $335_3$.

The DPAs 335 may be one or more appliances 335 connected in a cluster, and each consistency group 340 may be replicated using a different DPA.

The production site and the replications site(s) may be connected over a wide area network (WAN) 350 or over fiber channel or any other network.

Figure 4A:
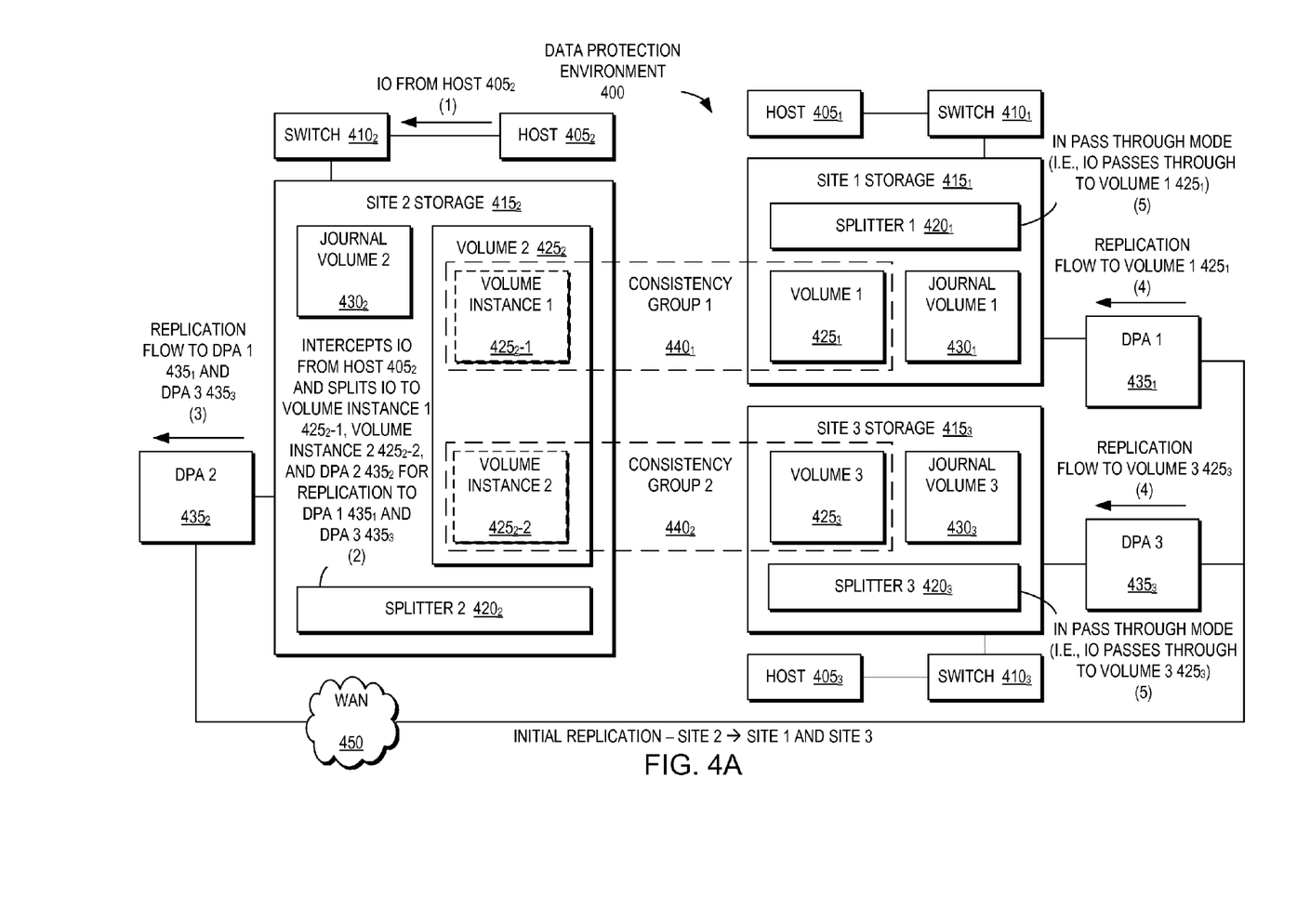
FIG. 4A is a block diagram illustrating a second volume represented as a plurality of volume instances replicated to a first volume and a third volume according to an example embodiment of the present invention.
Figure 4B:
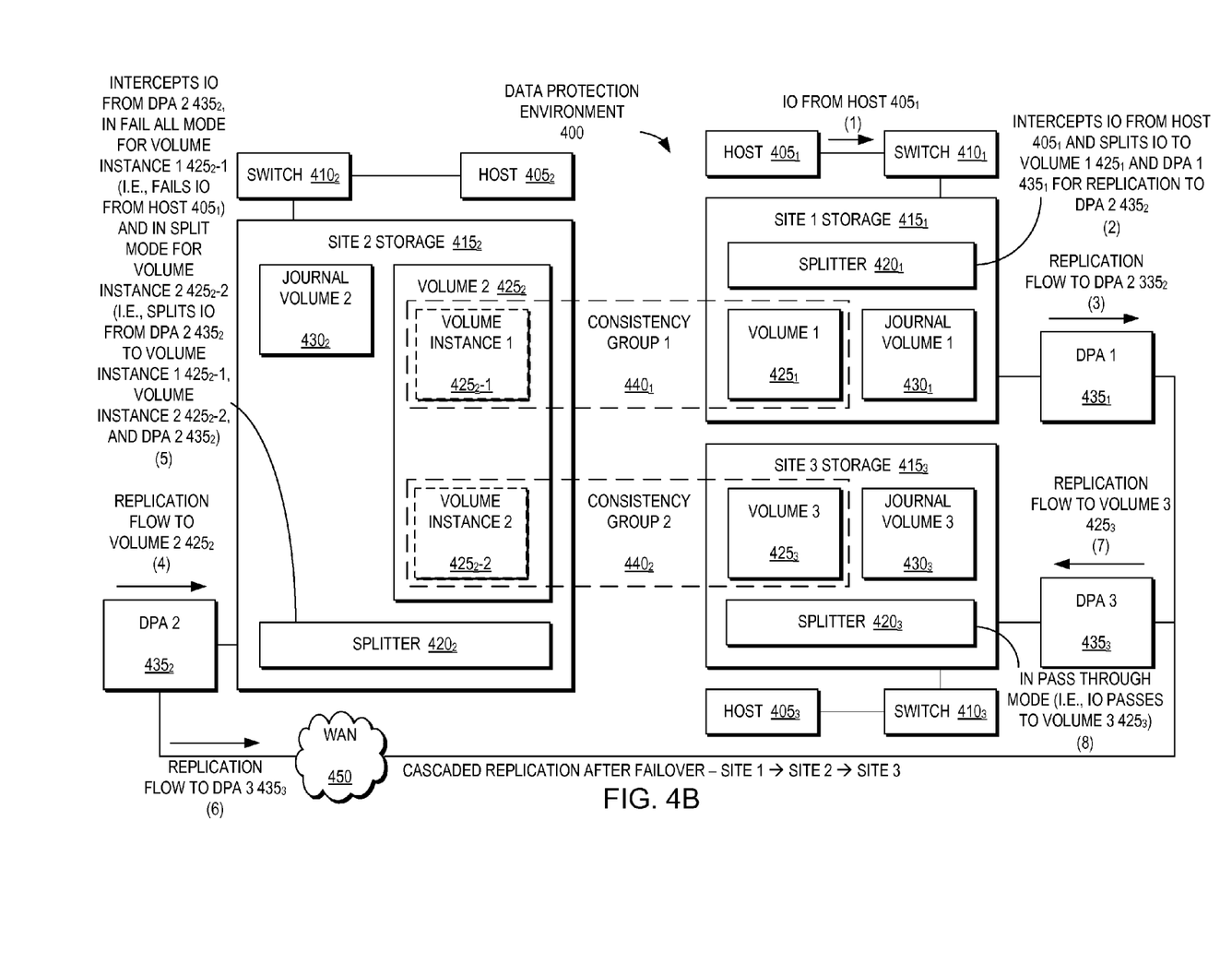
FIG. 4B is a block diagram illustrating failover of replication of a first volume instance of second volume to the first volume employing cascaded replication from the first volume to the second volume, and from the second volume to the third volume according to an example embodiment of the present invention.

It should be noted that the DPAs 335 do not have to be physical devices and may be a set of processes on the respective storage arrays 315 or virtual machines running inside the storage array 320 or at any external host 305. It also should be noted that, although the splitter 320, 420 in FIGS. 3, 4A and 4B is illustrated as being resident in the storage array 315, 415, the splitter 320, 420 also may reside in the switch 310, 410, in the host 305, 405, or as a virtual splitter running elsewhere in the data path. The block diagrams of FIG. 3 may be studied in conjunction with the flow diagrams of FIGS. 5-9 and the block diagrams of FIGS. 4A-4B may be studied in conjunction with the flow diagrams of FIGS. 10-12.

Figure 5:
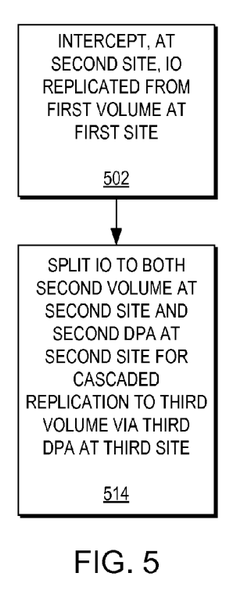
FIG. 5 is a flow diagram of a method for cascaded replication using a splitter according to an example embodiment of the present invention.

As illustrated in FIGS. 3 and 5, which is a flow diagram of a method for cascaded replication using a splitter according to an example embodiment of the present invention, the second splitter $320_2$ may (5) intercept an IO replicated from the first volume $325_1$ at the first site by the first DPA $335_2$ at the first site (502). Having intercepted the IO, the second splitter $320_2$ then may split the IO to both the second volume $325_2$ at the second site and the second DPA $335_2$ at the second site for cascaded replication to the third volume $325_3$ at the third site via the third DPA $335_3$ at the third site (514).

Figure 6:
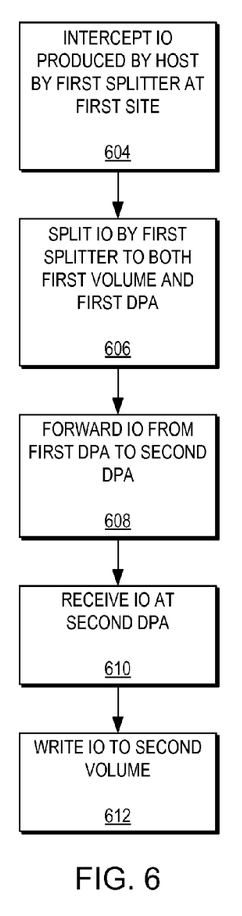
FIG. 6 is a flow diagram of a method for intercepting an IO replicated from a first volume at a first site by a first data protection appliance (DPA) at the first site according to an example embodiment of the present invention.

As illustrated in FIGS. 3 and 6, which is a flow diagram of a method for intercepting an IO replicated from a first volume at a first site by a first DPA at the first site (502) according to an example embodiment of the present invention, (1) an IO generated by the first host $305_1$ at the first site may be (2) intercepted by the first splitter $320_1$ at the first site (604) and then split the IO to both the first volume $325_1$ and the first DPA $335_1$ (606). The first DPA $335_1$ then may (3) forward (i.e., replicate) the IO to the second DPA $335_2$ (608) which may then (4) receive the IO for processing by the second splitter $320_2$ (610). The second DPA $335_2$ then may write the IO to the second volume $325_2$ (612)

Figure 7:
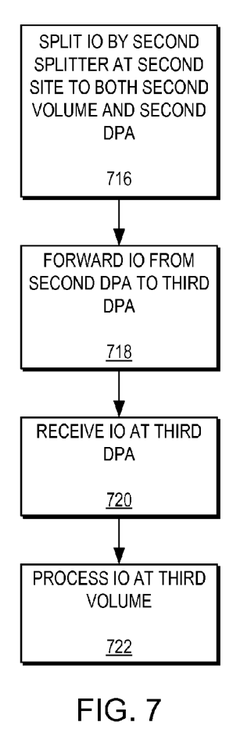
FIG. 7 is a flow diagram of a method for splitting the IO to both a second volume at a second site and a second DPA at the second site for cascaded replication to a third volume at a third site via a third DPA at the third site according to an example embodiment of the present invention.

As illustrated in FIGS. 3 and 7, which is a flow diagram of a method for splitting the IO to both a second volume at a second site and a second DPA at the second site for cascaded replication to a third volume at a third site via a third DPA at the third site (514) according to an example embodiment of the present invention, the second splitter $320_2$ at the second site may split the IO to both the second volume $325_2$ and the second DPA $335_2$ (716). The second DPA $335_2$ then may (6) forward (i.e., replicate) the IO to the third DPA $335_3$ (718) which may then (7) receive the IO for processing (720). The IO then may be processed at the third site (722).

Figure 8:
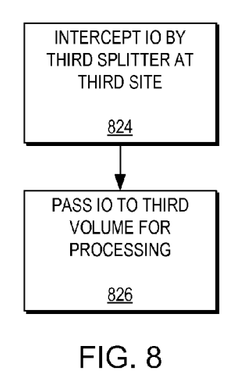
FIG. 8 is a flow diagram of a method for processing the IO at the third site according to an example embodiment of the present invention.

As illustrated in FIGS. 3 and 8, which is a flow diagram of a method for processing the IO at the third site according to an example embodiment of the present invention, the third splitter $320_3$ at the third site may (8) intercept the IO (824) and pass the IO to the third volume $325_3$ for processing (826).

Figure 9:
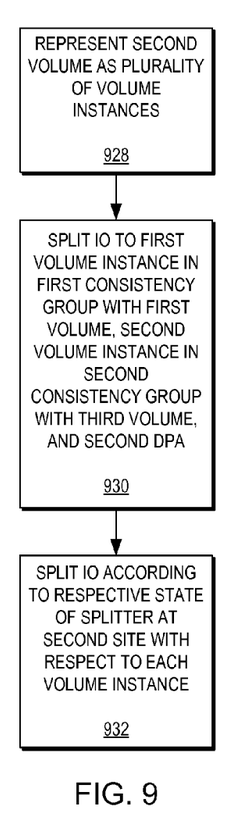
FIG. 9 is a flow diagram of a method for splitting the IO to a first volume instance in a first consistency group with the first volume, a second volume instance in a second consistency group with the third volume, and the second DPA according to an example embodiment of the present invention.

As illustrated in FIGS. 3 and 9, which is a flow diagram of a method for splitting the IO to a first volume instance in a first consistency group with the first volume, a second volume instance in a second consistency group with the third volume, and the second DPA according to an example embodiment of the present invention, the second volume $325_2$ may be represented as a plurality of volume instances $325_2$-1, $325_2$-2 (928). Accordingly, when the second splitter $320_2$ splits the IO to both the second volume $325_2$ at the second site and the second DPA $335_2$ at the second site for cascaded replication to the third volume $325_3$ at the third site (716), the second splitter $320_2$ may split the IO to the first volume instance $325_2$-1 in a first consistency group $340_1$ with the first volume $325_1$, the second volume instance $325_2$-2 in a second consistency group $340_2$ with the third volume $325_3$, and the second DPA $335_2$ (930). As will be described in greater detail below, in order to, for example, coordinate the splitting of the IOs from the first site to the second site and from the second site to the third site, the second splitter $320_2$ may split the IO according to a respective state of the second splitter $320_2$ with respect to each volume instance $325_2$-1, $325_2$-2 (932).

FIG. 4A is a block diagram illustrating a second volume represented as a plurality of volume instances replicated using multi copy replication to a first volume and a third volume according to an example embodiment of the present invention. As illustrated in FIG. 4A, at a second site, (1) a host $405_2$ sends an IO via a switch $410_2$ to second site storage $415_2$. A second splitter $420_2$ at the second site (2) intercepts the IO from the host $405_2$ and splits the IO to the second volume $425_2$ and the second DPA $435_2$ for replication to the first DPA $435_1$ at the first site and the third DPA $435_3$ at the third site. Here, multi copy replication is deployed, so the second splitter $420_2$ splits the IO to both volume instance 1 $425_2$-1 and volume instance 2 $425_2$-2 of volume 2 $425_2$. It should be understood that the volume instances $425_2$-1, $425_2$-2 are logical entities managed by the second splitter $420_2$ between the splitter $420_2$ and the second DPA $435_2$. It should be noted that, from the host's $405_2$ perspective and the storage's $415_2$ perspective, there is only one volume $425_2$. The second DPA $435_2$ then (3) receives the split IO from the second splitter $420_2$ and forwards the IO to the first DPA $435_1$ at the first site and the third DPA $435_3$ at the third site. The first DPA $435_1$ and the third DPA $435_3$ then (4) process the split IOs which are (5) intercepted by the respective splitters $420_1$, $420_3$, which may be in Fail All Mode (i.e., they accept only IOs generated by the DPAs), and written to the respective volumes $425_1$, $425_3$.

Figure 10:
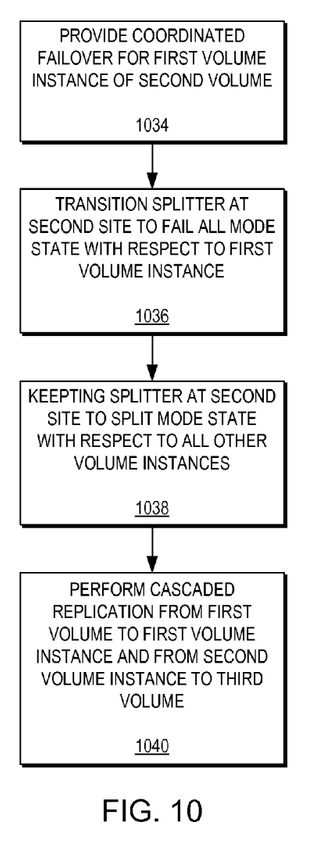
FIG. 10 is a flow diagram of a method for providing coordinated failover for a first volume instance of a second volume in an initial replication of both the first volume instance of the second volume at the second site to the first volume at the first site and a second volume instance of the second volume at the second site to the third volume at the third site according to an example embodiment of the present invention.

FIG. 10 is a flow diagram of a method for providing coordinated failover for a first volume instance of a second volume in an initial replication of both the first volume instance of the second volume at the second site to the first volume at the first site and a second volume instance of the second volume at the second site to the third volume at the third site according to an example embodiment of the present invention. In order to accommodate the failover, as illustrated in FIGS. 4B and 10, the second splitter $420_2$ provides coordinated failover for the first volume instance $425_2$-1 of the second volume $425_2$ (1034). First, the second splitter $420_2$ transitions to Fail All Mode with respect to the first volume instance $425_2$-1 (1036) and remains in Split Mode with respect to the second volume instance $425_2$-2 (i.e., all other volume instances of the plurality of volume instances) (1038). The second splitter $420_2$ then may perform cascaded replication from the first volume $425_1$ to the first volume instance $425_2$-1 and from the second volume instance $425_2$-2 to the third volume $425_3$ (1040). Thus, it should be understood that, if the second splitter $420_2$ is in Fail All Mode with respect to at least one volume instance $425_2$-1, $425_2$-2, the second splitter $420_2$ may accept IOs only from the second DPA $435_2$ for processing at the second volume $425_2$ and fails IOs issued from all other hosts (e.g., host $405_2$). In other words, during failover, IOs may be generated to the new target volume only from the DPA replicating to it with the volume instance that was replicating to the old target volume. However, the second splitter $420_2$ does intercept the IOs and split the IOs to the third site, thereby enabling replication from the first site to the second site and then from the second site to the third site (i.e., cascaded replication).

FIG. 4B is a block diagram illustrating failover of replication of a first volume instance of second volume to the first volume employing cascaded replication from the first volume to the second volume, and from the second volume to the third volume according to an example embodiment of the present invention. As illustrated in FIG. 4B, after failover of the second volume $425_2$, replication now occurs from the host $405_1$ at the first site. Thus, an (1) IO from the host $405_1$, via the switch $410_1$, is (2) intercepted by the first splitter $420_1$ and split to the first volume $425_1$ and the first DPA $435_1$ for replication to the second DPA $435_2$. The first DPA $435_1$ then (3) receives the split IO and forwards the split IO to the second DPA $335_2$. The second DPA $335_2$ then (4) receives the split IO.

The second splitter $420_2$ then (5) intercepts the IO from the second DPA $435_2$ and is in Fail All Mode with respect to the first volume instance $425_2$-1 (i.e., the second splitter $420_2$ fails IOs from host $405_2$) and is in Split Mode with respect to the second volume instance $425_2$-2 (i.e., the second splitter $420_2$ splits IOs from the second DPA $435_2$ to the first volume instance $425_2$-1, the second volume instance $425_2$-2, and the second DPA $435_2$ for replication to the third DPA $435_3$). The second DPA $435_2$ then (6) forwards the split IO to the third DPA $435_3$ which (7) receives the split IO and processes it to the third site storage $415_3$. The third splitter $420_3$ (8) intercepts the IO and, because it is in Fail All Mode, processes the IO to the third volume $430_3$, thereby providing cascaded replication of the IO from the first volume $430_1$ to the second volume $430_2$ and from the second volume $430_2$ to the third volume $430_3$.

It also should be understood that the IOs do not have write order fidelity (i.e., are not crash consistent). Although data is continuously applied to volumes, the distribution mechanism may not guarantee write order fidelity at every time. During distribution, writes are written in write order fidelity order to the stream. Further, many IOs may be applied at the same time to improve performance. In other words, when replicating, the DPAs do not necessarily apply the IOs to the volumes in the same order. Additionally, there may not be write order fidelity because of writes to the same location being folded by the DPA. This lack of write order fidelity means that the volumes may not be consistent at all times. For example, the first splitter $420_1$ may still be splitting IOs using cascaded replication to the second site and the third site. However, the third DPA $435_3$ at the third site cannot create a snapshot of the third volume $425_3$ at the third site because it is not consistent with the first volume $425_1$ at the first site.

Figure 11:
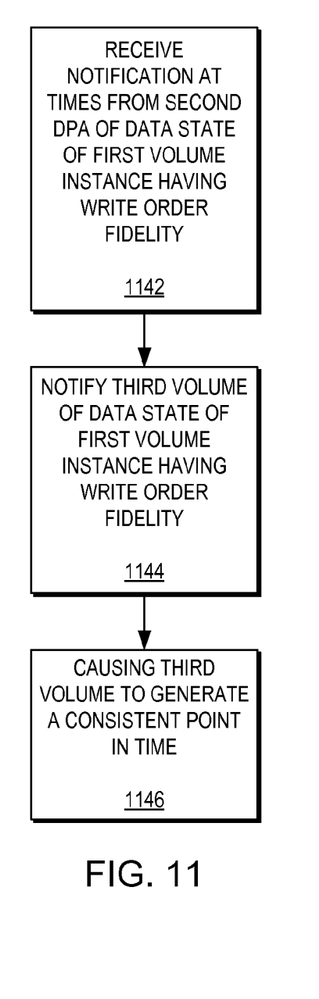
FIGS. 11-12 are flow diagrams of methods for providing application consistency across the first volume and the third volume according to example embodiments of the present invention.

Accordingly, as illustrated in FIGS. 4 and 11, which is a flow diagram of a method for providing application consistency across the first volume and the third volume according to example embodiments of the present invention, knowledge of consistent points in time at the second splitter $420_2$ may be leveraged. First, once the second splitter $420_2$ finishes applying data for a consistent point, the second splitter $420_2$ will receive a notification from the second DPA $435_2$ at times of a data state of the first volume $425_1$ having write order fidelity (1142). For example, the second DPA $435_2$ may send a command, such as a vendor-specific command, to the storage array for the second site storage $415_2$. The second splitter $420_2$ then may be notified via a command, such as a SCSI command, that this is a consistent point in time and will send the second DPA $415_2$ a SCSI command notifying it to create a bookmark in the. Then, during replication according to the second consistency group $440_2$ from the second volume $425_2$ to the third volume $425_3$, there will be periodic bookmarks indicating a crash consistent point in time. In other words, when DPA $435_2$ at site 2 applies changes to volume $425_2$ at site 2 it will send the storage $415_2$ a command notifying that the volume $425_2$ is consistent. The splitter $420_2$ will intercept the command and send it to the DPA $435_2$ at site 2 which is replicating the volume $425_2$ to site 3 which will create a bookmark.

Figure 12:
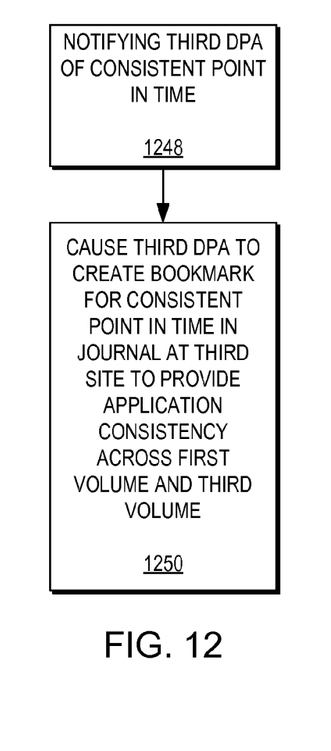

Therefore, periodically, the second DPA $435_2$ may stop applying new data (i.e., from the second site DPA $435_2$) and may send the second splitter $420_2$ a command that the data is consistent. Then, to notify the third volume $425_3$ of the data state of the first volume instance $425_2$-1 having write order fidelity (1144), for example, the second splitter $420_2$ then may send a command (e.g., a flush command) indicating a consistent point in time and causing the third volume $425_3$ to generate a consistent point in time (1146). As illustrated in FIG. 12, the bookmark may be create by notifying the third DPA $435_3$ of the consistent point in time (1248) which may cause (i.e., trigger) the third DPA $435_3$ to create a consistent bookmark in the third journal volume $430_3$ (1250).

Figure 13:
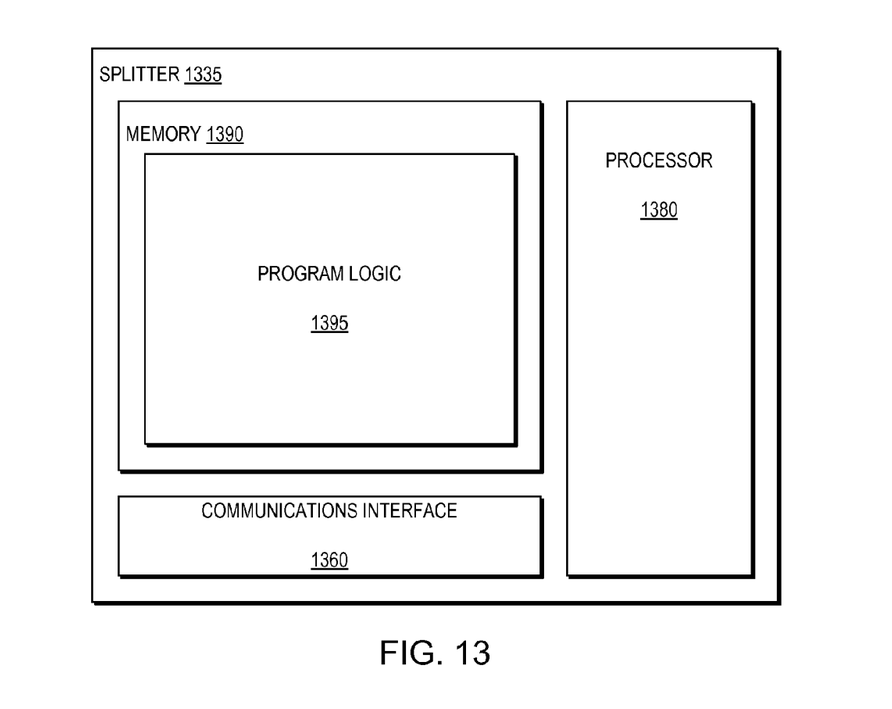
FIG. 13 is a block diagram of an example embodiment apparatus according to the present invention.
Figure 14:
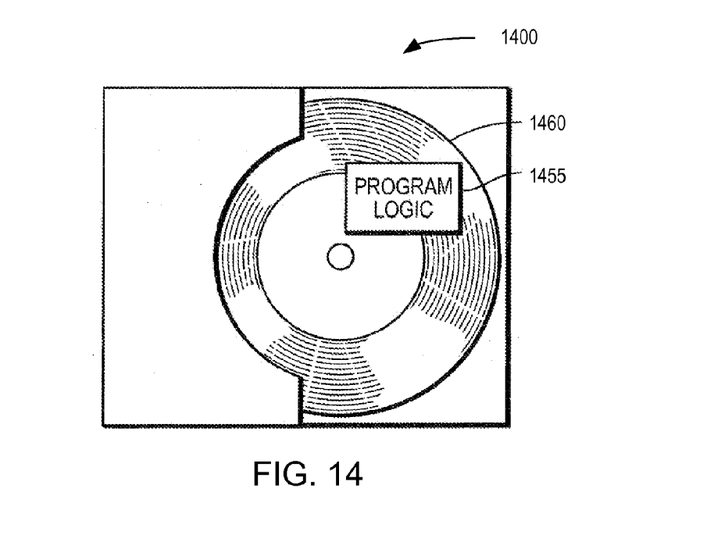
FIG. 14 is an illustration of an example embodiment of the present invention as embodied in program code.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 13, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 14 shows Program Logic 1455 embodied on a computer-readable medium 1460 as shown, and wherein the Logic is encoded in computer-executable code configured for carrying out the reservation service process of this invention and thereby forming a Computer Program Product 1400.

The logic for carrying out the method may be embodied as part of the aforementioned system, which is useful for carrying out a method described with reference to embodiments shown in, for example, FIGS. 1-12. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for cascaded replication using a splitter, the method comprising:
    intercepting an input/output (IO) by a first splitter at a first site;
    splitting the IO by the first splitter at the first site to both a first volume at the first site and a first data protection appliance (DPA) at the first site;
    forwarding the IO from the first DPA at the first site to a second DPA at a second site;
    receiving the IO at the second DPA at the second site;
    intercepting the IO by a second splitter at the second site;
    splitting the IO by the second splitter at the second site to both a second volume at the second site, represented as a plurality of volume instances, and the second DPA at the second site by splitting the IO to a first volume instance of the second volume in a first consistency group with the first volume, to a second volume instance of the second volume in a second consistency group with the third volume, and to the second DPA;
    forwarding the IO from the second DPA at the second site for cascaded replication to a third DPA at a third site;
    receiving the IO at the third DPA at the third site; and
    processing the IO to a third volume at the third site.

2. The method of claim 1 wherein processing the IO at the third site comprises:
    intercepting the IO by a third splitter at the third site; and
    passing the IO to the third volume for processing.

3. The method of claim 1 wherein splitting the IO to each volume instance of the plurality of volume instances and the second DPA comprises splitting the IO according to a respective state of a splitter at the second site with respect to each volume instance of the plurality of volume instances.

4. The method of claim 3 further comprising, for an initial replication of both a first volume instance of the second volume at the second site to the first volume at the first site and a second volume instance of the second volume at the second site to the third volume at the third site, providing coordinated failover for the first volume instance of the second volume comprising:
    transitioning the splitter at the second site to a fail all mode state with respect to the first volume instance of the plurality of volume instances;
    keeping the splitter at the second site in a split mode with respect to all other volume instances of the plurality of volume instances; and
    performing cascaded replication from the first volume to the first volume instance and from the second volume instance to the third volume.

5. The method of claim 4 wherein, if the splitter at the second site is in the fail all mode state with respect to at least one volume instance, accepting IOs only from the second DPA for processing at the second volume and failing IOs issued from all other hosts.

6. The method of claim 1 wherein the second DPA does not maintain write order fidelity of the IOs arriving at the first volume instance of the plurality of volume instances at all times, the method further comprising:
    receiving a notification at times from the second DPA of a data state of the first volume instance having write order fidelity;
    notifying the third volume of the data state of the first volume instance having write order fidelity; and
    causing the third volume to generate a consistent point in time.

7. The method of claim 6 wherein causing the third volume to generate a consistent point in time comprises:
    notifying the third DPA of the consistent point in time; and
    causing the third DPA to create a bookmark for the consistent point in time in a journal at the third site to provide consistency across the first volume and the third volume.

8. A system for cascaded replication using a splitter comprising:
    a first site comprising a first volume, a first splitter, and a first data protection appliance (DPA);
    a second site comprising a second volume, a second splitter, and a second DPA; and
    a third site comprising a third volume and a third DPA;
    wherein the splitter at the first site is configured to intercept an input/output (IO) and split the IO to both the first volume at the first site and the first DPA at the first site;
    wherein the first DPA at the first site is configured to forward the IO to the second DPA at the second site;
    wherein the second DPA at the second site is configured to receive the IO and write the IO to the second volume;
    wherein the second splitter at the second site is configured to intercept the IO and split the IO to both the second volume at the second site, represented as a plurality of volume instances, and the second DPA at the second site by splitting the IO to a first volume instance of the second volume in a consistency group with the first volume, to a second volume instance of the second volume in a second consistency group with the third volume, and to the second DPA;
    wherein the second DPA at the second site is further configured to forward the IO for cascaded replication to the third DPA at the third site; and
    wherein the third DPA at the third site is configured to receive the IO and process the IO to a third volume at the third site.

9. The system of claim 8 wherein the third splitter at the third site is configured to intercept the IO and pass the IO to the third volume for processing.

10. The system of claim 8 wherein the second splitter is further configured to split the IO according to a respective state of the second splitter with respect to each volume instance of the plurality of volume instances.

11. The system of claim 10 wherein, for an initial replication of both a first volume instance of the second volume at the second site to the first volume at the first site and a second volume instance of the second volume at the second site to the third volume at the third site, the second splitter is further configured to provide coordinated failover for the first volume instance of the second volume, transition to a fail all mode state with respect to the first volume instance of the plurality of volume instances, keeping a split mode with respect to all other volume instances of the plurality of volume instances, and perform cascaded replication from the first volume to the first volume instance and from the second volume instance to the third volume.

12. The system of claim 11 wherein, if the second splitter is in the fail all mode state with respect to at least one volume instance, the second splitter is further configured to accept IOs only from the second DPA for processing at the second volume and fail IOs issued from all other hosts.

13. The system of claim 8
wherein the second DPA does not maintain write order fidelity of the IOs arriving at the first volume instance of the plurality of volume instances at all times; and
wherein the second splitter is further configured to receive a notification at times from the second DPA of a data state of the first volume instance having write order fidelity, notify the third volume of the data state of the first volume instance having write order fidelity, and cause the third volume to generate a consistent point in time.

14. The system of claim 13 wherein the second splitter is further configured to notify the third DPA of the consistent point in time, and cause the third DPA to create a bookmark for the consistent point in time in a journal at the third site to provide consistency across the first volume and the third volume.

15. A computer-program product including a non-transitory computer-readable storage medium encoded with computer-program code that, when executed on a processor of a computer, causes the computer to provide cascaded replication using a splitter, the computer-program code comprising:

computer program code for intercepting an input/output (IO) by a first splitter at a first site;

computer program code for splitting the IO by the first splitter at the first site to both a first volume at the first site and a first data protection appliance (DPA) at the first site;

computer program code for forwarding the IO from the first DPA at the first site to a second DPA at a second site;

computer program code for receiving the IO at the second DPA at the second site;

computer program code for intercepting the IO by a second splitter at the second site computer program code for splitting the IO by the second splitter at the second site to both a second volume at the second site, represented as a plurality of volume instances, and the second DPA at the second site by splitting the IO to first volume instance of the second volume in a first consistency group with the first volume, to a second volume instance of the second volume in a second consistency group with the third volume, and to the second DPA;

forwarding the IO from the second DPA at the second site for cascaded replication to a third DPA at a third site;

receiving the IO at the third DPA at the third site; and processing the IO to a third volume at the third site.

* * * * *